J. H. LINDSEY.
HARROW.
APPLICATION FILED JUNE 5, 1909.

943,690.

Patented Dec. 21, 1909.

Witnesses

Inventor
John H. Lindsey.
By C. A. Snow & Co.
Attorneys

UNITED STATES PATENT OFFICE.

JOHN H. LINDSEY, OF KEVIL, KENTUCKY.

HARROW.

943,690.  Specification of Letters Patent.  Patented Dec. 21, 1909.

Application filed June 5, 1909. Serial No. 500,256.

*To all whom it may concern:*

Be it known that I, JOHN H. LINDSEY, a citizen of the United States, residing at Kevil, in the county of Ballard and State of Kentucky, have invented a new and useful Harrow, of which the following is a specification.

It is the object of the present invention to provide an improved construction of harrow and the invention aims more specifically to provide a harrow which may be readily converted into a drag and when so converted may be employed not only as a drag but in numerous other ways, for example, as a stone boat.

It is a further object of the invention to provide, in a harrow having oscillatory tooth bars, means for holding the tooth bars in one or another of two positions and in so constructing and arranging such means that the same will not be subjected to any considerable strain when the device is in use either as a harrow or as a drag.

Figure 1:
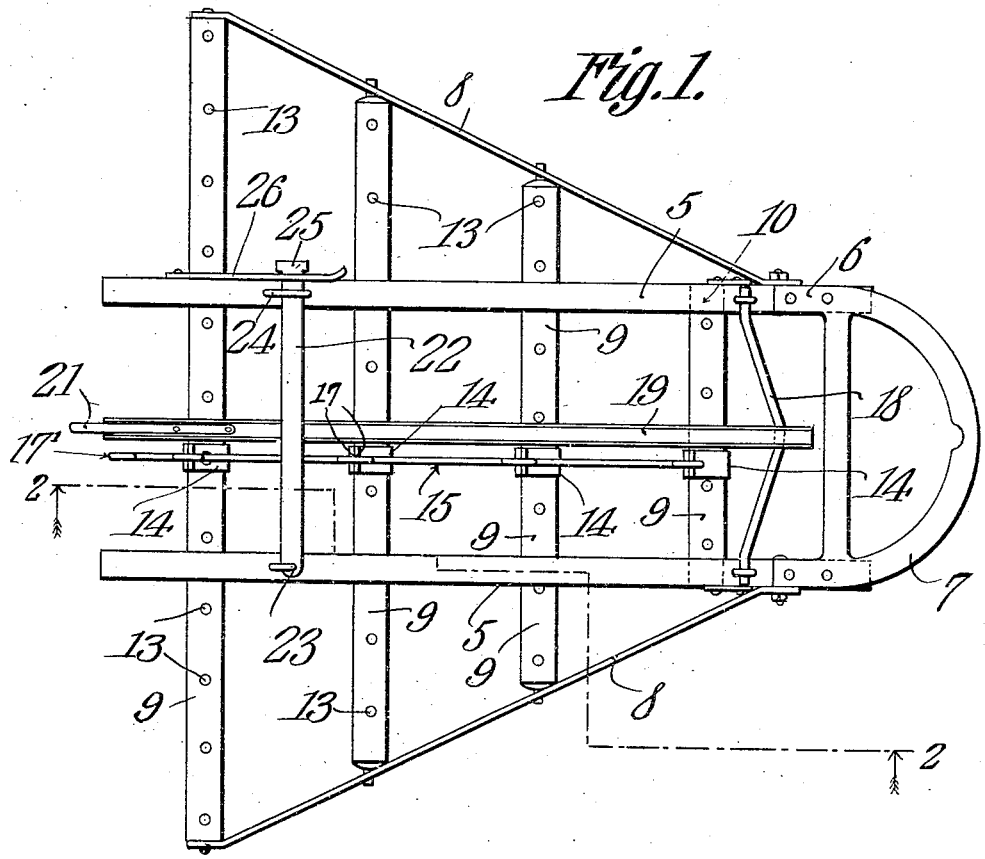
Figure 2:
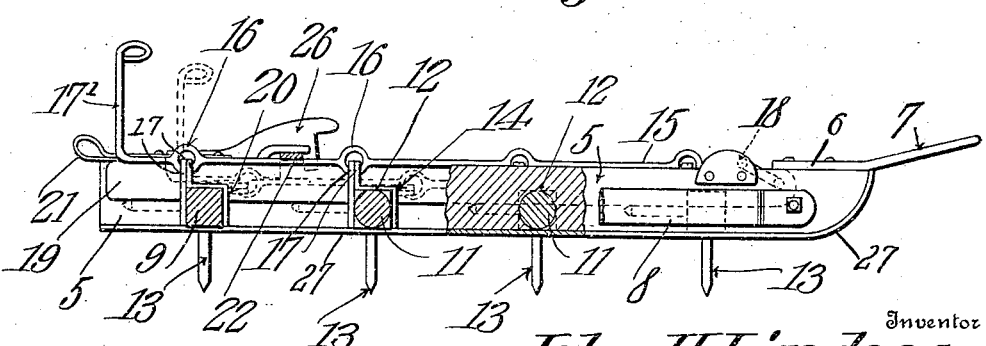

In the accompanying drawings, Figure 1 is a top plan view of a harrow constructed in accordance with the present invention, and Fig. 2 is a vertical sectional view therethrough on the line 2—2 of Fig. 1.

In the drawings, the harrow is illustrated as comprised in part of a frame including side sills 5 which are connected at their forward ends by a draft frame 6 having an arcuate forward portion 7 to which may be attached the draft appliances. The said side sills 5 of the frame of the harrow are further braced by means which will be presently described but before proceeding with a description of such means reference will be had to other portions of the harrow frame. The portions just mentioned are embodied in the side bars 8 which are secured at their forward ends one to each of the side beams 5 of the frame at the forward end thereof and extend rearwardly outwardly at an angle from the said respective side beams as is clearly shown in Fig. 1 of the drawings, their rear ends being considerably spaced from the rear ends of the side beams and the said side beams being parallel throughout their entire lengths.

The side beams 5 of the frame of the harrow and also the side bars 8 thereof serve to support oscillatory tooth bars which are indicated by the numeral 9. These tooth bars are arranged transversely of the harrow frame one behind the other and they increase in length successively in order toward the rear of the harrow frame. The foremost one of the tooth bars is journaled at its ends in the side bars 5 as indicated by the numeral 10 whereas the tooth bars rearwardly of this foremost one are journaled at their ends in the side bars 8 of the harrow frame, they being formed however inwardly of each end with a cylindrical reduced bearing portion 11 which is received in suitable bearings 12 provided upon the side beams 5 of the harrow frame. Each of the tooth bars 9 carries a plurality of teeth 13 which project at right angles therefrom, the said tooth bars being polygonal in cross section for a purpose which will be presently explained; except at the points of formation of the bearing portions 11 where they are cylindrical in cross section.

It will be understood from the foregoing that by forming the journal portions 11 cylindrical and of a diameter not greater than the thickness of the tooth bars at other points, the side beams 5 of the harrow frame will be firmly held against displacement.

As heretofore stated, the tooth bars 9 are mounted for oscillation and in order that they may be simultaneously rocked, there is fixed upon each of the bars, at a point between its ends, a bracket 14 to which is pivotally connected a rod 15, it being understood that this rod is common to all of the tooth bars. The pivotal connection is preferably had by forming the bar at points in its length with eyes 16 in which are received ears 17 forming portions of the brackets 14. At its rear end, this rod 15 is provided with an upstanding handle 17' which may be grasped whereby the rod may be pulled rearwardly or shoved forwardly to rock the bars simultaneously in a corresponding direction.

A rod 18 is mounted transversely of the frame of the harrow at the forward end thereof and pivoted at its forward end to this rod is a locking bar 19 which is formed at points in its length, in its under edge, with notches 20 which are of the same outline as the tooth bars, in cross section. This locking rod 19 may be swung upon the rod 18 as will be presently understood but is incapable of longitudinal movement it being particularly braced against such movement by the rod 18 which rod has its intermediate portion located forwardly of its end portions which are secured in the said side beams 5 of the harrow frame. This manner of forming the rod 18 positively insures against its ends being pulled from the said side beams 5 and further insures against buckling of the rod.

It will be understood that inasmuch as the harrow bars, in cross section, have the same general outline as have the notches in the locking bar 19, the said tooth bars may seat in the notches when in the position shown in full lines or in dotted lines in Fig. 2 of the drawings. In the former instance the teeth upon the bars project downwardly whereby the device may be utilized as a harrow but in the latter instance these teeth project rearwardly as shown in dotted lines whereby they will not come into working engagement with the soil. The locking bar 19 is provided at its rear end with a handle 21 by means of which it may be readily swung upwardly to disengage from the tooth bars and permit of the said bars being rocked to full or dotted line position as shown in Fig. 2.

As a means for holding the locking bar 19 in engagement with the tooth bars 9 of the harrow whereby these bars will be firmly held against oscillatory movement when the harrow is in use, there is provided a latch bar 22 which is pivoted at one end as at 23 to one of the side beams 5 of the harrow frame and at its other end engages beneath a keeper 24 upon the other side beam 5. The said bar 22, as will be readily understood, extends above the locking bar 19 and prevents upward movement of the bar out of engagement with the tooth bars and at its last mentioned end said latch bar is formed with a head 25. It is expedient that some means be provided for holding the latch bar against disengagement from the keeper 24 and to this end I have provided a pivoted hook 26 which is carried by that beam 5 upon which the keeper 24 is mounted and which engages with the said latch bar 22 directly inwardly of its head 25 and holds it against disengagement from the keeper 24 as stated.

From the foregoing description of the invention it will be readily understood that the implement may be converted from a harrow into a drag by swinging upwardly the locking bar 19, then shoving forwardly on the handle 17′ and associated rod 15 and afterward dropping the locking bar 19 into engagement with the tooth bars and locking the said bar 19 against disengagement. When the tooth bars are in this position, as heretofore stated, their teeth project rearwardly and are out of position to have working engagement with the soil. It is preferable that a runner in the nature of a length of strap iron 27 be secured to the under edge of each of the side sills 5 of the frame whereby the said edges of the sills will not be worn due to travel over road and other surfaces.

It will further be apparent from the foregoing description of the invention that its use, when not employed as a harrow, is not limited to that of a drag, a log, a stone boat, or the like, but there are numerous uses to which it may be put.

What is claimed is:—

1. In a harrow, a plurality of oscillatory tooth bars, a swinging locking bar engaging with the tooth bars to hold the same in one position or another, and means for holding the said locking bar against disengagement from the tooth bars.

2. In a harrow, a plurality of oscillatory tooth bars, a swinging locking bar having seats engaging with the tooth bars to hold the same in one position or another, means for holding the said locking bar against disengagement from the tooth bars, and means whereby the tooth bars may be simultaneously oscillated.

3. In a harrow, a plurality of oscillatory tooth bars, means for simultaneously oscillating said bars, a pivoted locking bar engaging with the tooth bars to hold the same in one position or another, and a latch bar coöperating with the said locking bar whereby to hold the same against disengagement from the tooth bars.

4. In a harrow, a plurality of oscillatory tooth bars, means for simultaneously oscillating said tooth bars, the said tooth bars being polygonal in cross section, a locking bar having polygonal recesses engaging with the tooth bars whereby to hold the same in one position or another, and means for holding the said locking bar against disengagement from the tooth bars.

5. In a harrow, a plurality of oscillatory tooth bars, a swinging locking bar having seats engaging with the tooth bars to hold the same in one position or another, means for holding the said locking bar against disengagement from the tooth bars, and means whereby the tooth bars may be simultaneously operated, said means comprising brackets secured upon the tooth bars and having upstanding apertured ears, and a rod provided at points in its length with eyes having pivotal connection with the ears, the said rod being provided at one end with an upstanding handle portion.

In testimony that I claim the foregoing as my own, I have hereto affixed my signature in the presence of two witnesses.

JOHN H. LINDSEY.

Witnesses:
W. W. RUSSELL,
B. HOOK.